(12) United States Patent
Kunz

(10) Patent No.: US 6,223,221 B1
(45) Date of Patent: Apr. 24, 2001

(54) SYSTEM AND METHOD FOR CALCULATING THE TRANSFER RATE ACROSS A COMMUNICATION MEDIUM USING A DOWNLOADED TEST PROGRAM AND TRANSFERRING DATA ACCORDINGLY

(75) Inventor: James R. Kunz, Maine, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/019,327

(22) Filed: Feb. 5, 1998

(51) Int. Cl.[7] .................... G06F 15/173; G06F 15/16
(52) U.S. Cl. .................. 709/224; 709/203; 709/232; 709/216
(58) Field of Search .................... 709/203, 217, 709/219, 220, 224, 228, 231, 236, 102, 103, 229, 232; 707/704; 370/471; 380/49

(56) References Cited

U.S. PATENT DOCUMENTS

| | | |
|---|---|---|
| 5,448,561 | 9/1995 | Kaiser et al. ............... 370/471 |
| 5,623,605 | 4/1997 | Keshav et al. .............. 709/236 |
| 5,634,051 | 5/1997 | Thomson ...................... 707/5 |
| 5,659,742 | 8/1997 | Beattie et al. ............. 707/104 |
| 5,673,322 | 9/1997 | Pepe et al. .................. 380/49 |
| 5,724,514 * | 3/1998 | Arias ........................ 709/235 |
| 5,726,984 * | 3/1998 | Kubler et al. .............. 370/349 |
| 5,845,084 * | 12/1998 | Cordell et al. ............. 709/234 |
| 5,920,701 * | 7/2000 | Miller et al. .............. 709/228 |
| 5,933,827 * | 8/1999 | Cole et al. .................. 707/10 |
| 5,944,793 * | 8/1999 | Islam et al. ................ 709/220 |
| 6,003,030 * | 12/1999 | Kenner et al. ............... 707/10 |
| 6,006,260 * | 12/1999 | Barrick, Jr. et al. ....... 709/224 |
| 6,009,429 * | 12/1999 | Greer et al. ................. 707/10 |
| 6,021,439 * | 2/2000 | Turek et al. ................ 709/224 |
| 6,035,332 * | 4/2000 | Ingrassia, Jr. et al. ..... 709/224 |
| 6,052,730 * | 4/2000 | Felciano et al. ............ 709/225 |
| 6,065,059 * | 5/2000 | Shieh et al. ................ 709/223 |
| 6,070,190 * | 5/2000 | Reps et al. ................. 709/224 |

OTHER PUBLICATIONS

Special Edition Using Netscape 3, Mark R. Brown, Que Coprporation, pp. 669–673, 1996.*
The modified mapping heuristic algorithm, Gan, Boon Ping, Huang, Shell Ying, Jun. 13, 1996.*
Computer Dictionary, Microsoft Press, Third Edition, 1997.*
IBM Technical Disclosure Bulletin vol. 37, No. 04A, 04/94, "Dynamic Computation of TCP Maximum Window Size for Directly connected Hosts".
AT997023—DOSS Printout.

* cited by examiner

Primary Examiner—Zarni Maung
Assistant Examiner—B. Prieto
(74) Attorney, Agent, or Firm—Arthur J. Samodovitz

(57) ABSTRACT

A system and method determines a data transfer rate from a server to a client as follows. A server transfers a test program or a reference to the test program to the client and the client executes the test program. The test program requests test data from the server, measures the elapsed time to obtain the test data, and calculates a transfer rate based on the length of the test data and the elapsed time. Either the client or the server selects data corresponding to the client request, to send to the client based on the calculated transfer rate. The system and method can be used in a WWW environment where the data is a web page and the test program is an applet.

34 Claims, 8 Drawing Sheets

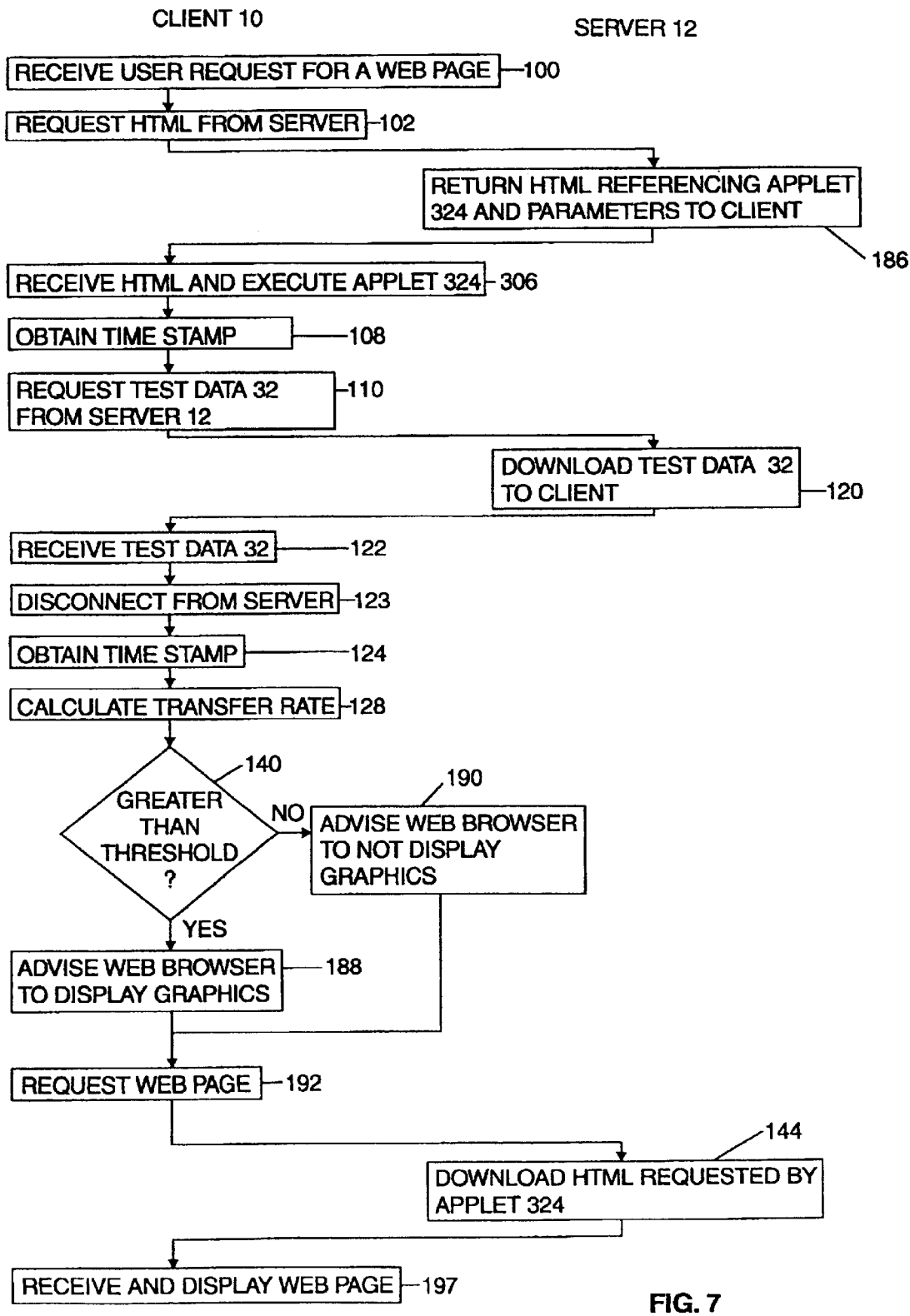

SYSTEM AND METHOD FOR CALCULATING THE TRANSFER RATE ACROSS A COMMUNICATION MEDIUM USING A DOWNLOADED TEST PROGRAM AND TRANSFERRING DATA ACCORDINGLY

BACKGROUND OF THE PRESENT INVENTION

The present invention relates generally to transfer of data from a server to a client via the internet or other communication medium and deals more particularly with a technique to determine the rate at which data can be transferred across the communication medium.

There are many communication mediums available today which interconnect clients to servers and many data formats for the communications. One example is the world wide web (WWW) with its web page data format. The WWW comprises a multitude of computer servers and an "internet" of communications lines and intermediary routers to connect the clients to the servers. The servers manage databases which contain the web pages. Each of the clients includes a "web browser" which is an interface to the user and the WWW. One common web browser is the Netscape Navigator (™) web browser licensed by Netscape Communications Corporation. The Netscape Navigator web browser is further described in "Hands on Netscape" by David Sachs, Prentice Hall, Upper Saddle River, N.J., 1996 ISBN013240284X.

Each web page has a "URL" address which comprises an access method/protocol designation such as hypertext transport protocol (HTTP) as a prefix, a server name, and the requested data as a suffix. The server name typically includes a "domain name" which is the name of a company, educational institution or other organization that owns the server. The request indicates a web page associated with the server. There are different ways that a client can obtain a web page. If the client knows the URL, the client can directly request the web page from the server. However, if the client only knows the server name, the client can address the server name and in response, the server will present the "home page" for the server. The home page (and other web pages) typically includes tags or "hot links" which reference other associated web pages. When the user selects a hot link, the web browser requests the respective web page from the corresponding server. In response to the request, the server returns an HTML page which typically includes text and may reference graphics, applets, audio files and video files. The client can then obtain the referenced graphics, applets, audio files and video files from the server(s) which manages them.

The rate at which a server can transfer a web page to a client is limited by several factors—the client's modem or other communication hardware, availability of the target server and any intermediary routers, and availability and throughput of the communication lines. In recent years there has been a large increase in the number of servers, web pages and "network traffic" on the WWW. While this has increased the amount of available information, this has slowed access to the web pages by congesting the servers, routers and communication lines.

While the text usually constitutes a small amount of data and can be transferred rapidly with even a modest transfer rate, the graphics, applets, audio files and video files may be lengthy and time consuming to transfer with a modest transfer rate. Existing web browsers permit the user to select a "no graphics" option. When selected, the web browser will not request (or display) any graphics referenced in an HTML that has been downloaded. This greatly reduces the download time for those web pages which reference complex graphics. However, the graphics may provide important information and hot links, and the data transfer rate may have been fast enough to provide the graphics to the client within a reasonable amount of time.

An IBM Web Browser Intelligence tool gives the user valuable information as to availability of web pages and the download time. The IBM Web Browser Intelligence tool automatically "pings" each server referenced by a hot link on a web page when the web page is initially loaded and displayed. If the server is in existence and is available to process the ping request, the server responds with a simple acknowledgment of its existence. The IBM Web Browser Intelligence tool also estimates the time required to fetch web pages managed by this server by measuring the time between the sending of the ping request and receipt of an acknowledgment from the server. (The actual fetch time will also depend on the length of data, graphics, applets, audio files and video files of the web page and the performance and availability of the server and web page storage medium for an actual data transfer). The IBM Web Browser Intelligence tool then indicates to the user which servers currently exist and the approximate fetch rate as follows. Red dots adjacent to a hot link indicate that the server is not currently available or very slow to respond. Yellow dots adjacent to a hot link indicate that the respective server is currently available but the fetch rate is slow. Green dots adjacent to a hot link indicate that the respective server is currently available and the fetch rate is fast. The IBM Web Browser Intelligence tool re-pings each server associated with each hot link at a user specified interval to update the availability status of every hot link. Despite the significant value of the IBM Web Browser Intelligence tool, improvements would be helpful to better estimate the download time.

It was also known for a server to ask a client user what is its "connectivity rate". The user will respond either with its modem rate or an estimate based on knowledge of the communications hardware. The client modem rate is a maximum transfer rate to the client; the server, routers or communication lines may be slower. The actual transfer rate can also change with time as the usage of the communication line, server and routers changes.

A general object of the present invention is to attempt to provide a client, who has requested data, with at least a meaningful subset of that data in a usable form within a reasonable amount of time.

SUMMARY OF THE INVENTION

The invention resides in a system and method for determining a data transfer rate from a server to a client. A server transfers a test program or a reference to the test program to the client and the client executes the test program. The test program requests test data from the server, measures the elapsed time to obtain the test data, and calculates a transfer rate based on the length of the test data and the elapsed time.

According to one feature of the present invention, either the client or the server selects data corresponding to the client request, to send to the client based on the calculated transfer rate. If the transfer rate is relatively high, then a relatively large amount of data is sent and vice versa.

The present invention can be used in a WWW environment where the data is a web page and the test program is an applet.

BRIEF DESCRIPTIONS OF THE FIGURES

Figure 3:
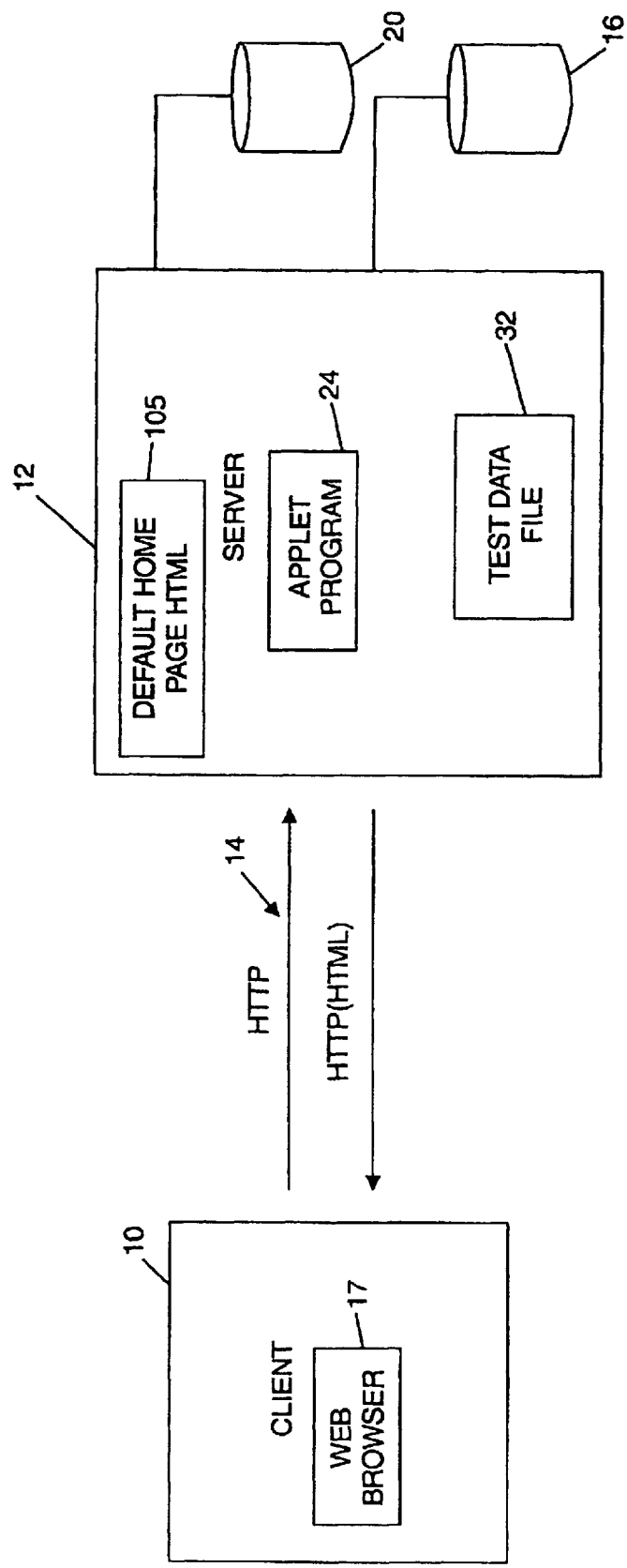
FIG. 3 is a block diagram of a client, a server and networking communication lines on the WWW in accordance with a second embodiment of the present invention.
Figure 5A:
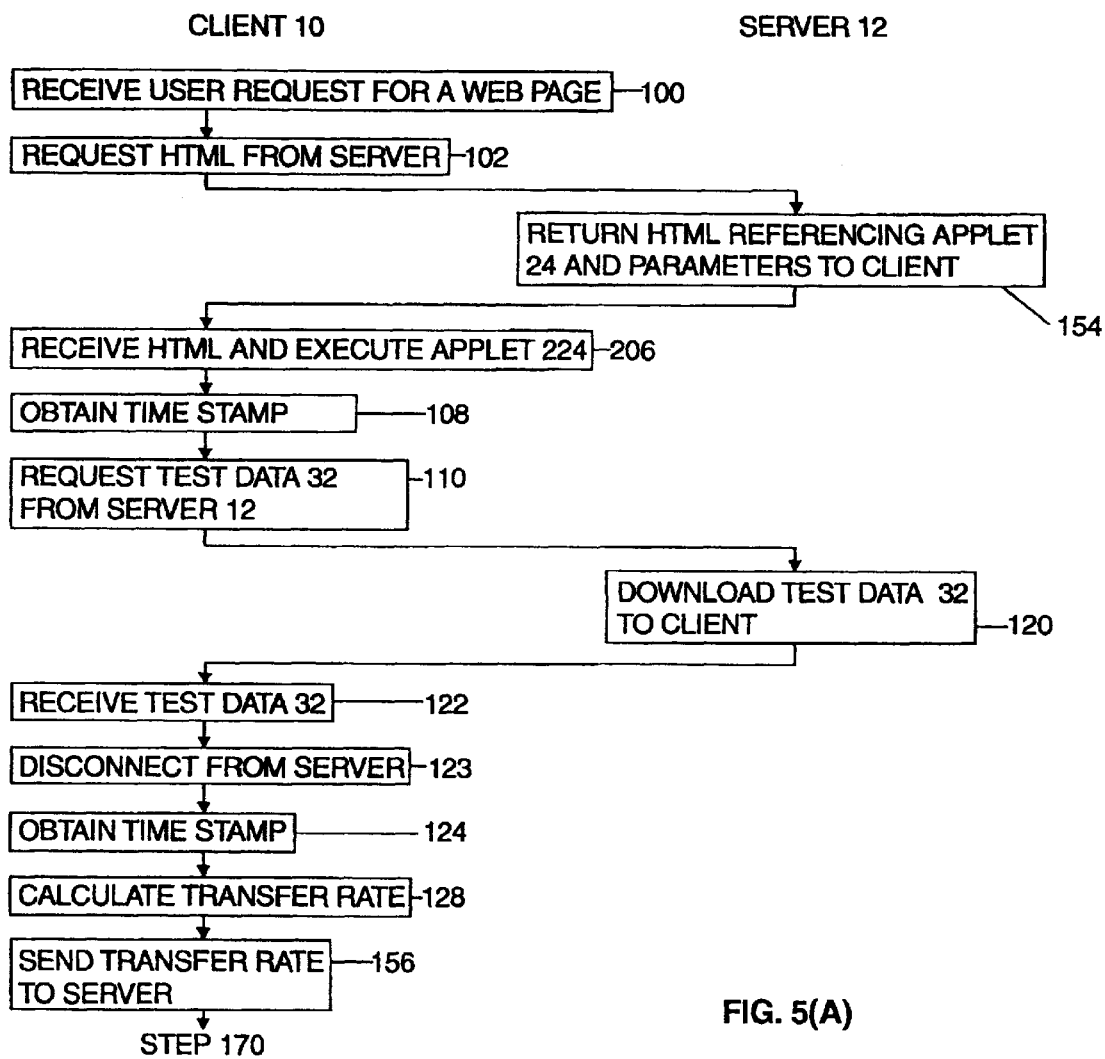
Figure 5B:
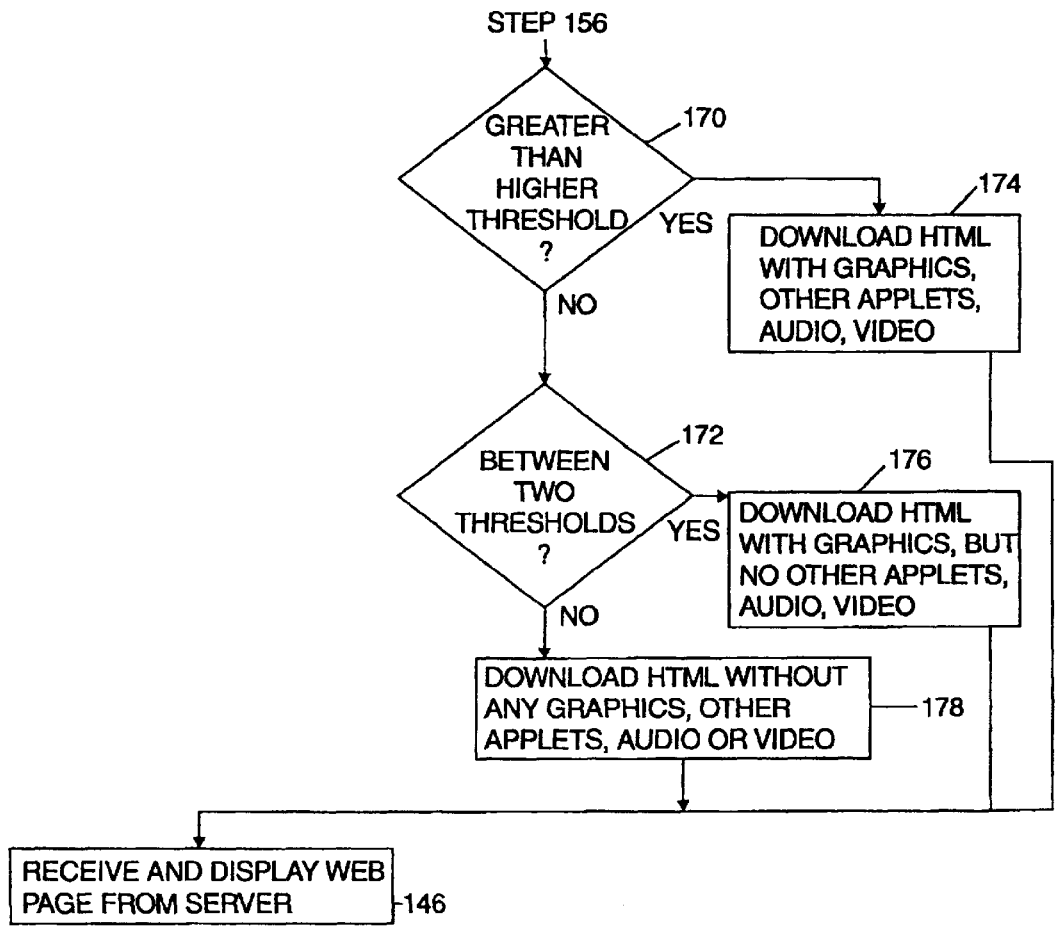

FIGS. 5(a) and 5(b) form a flow chart illustrating functions of the client and server within the network of FIG. 3 according to a third embodiment of the present invention.

Figure 6:
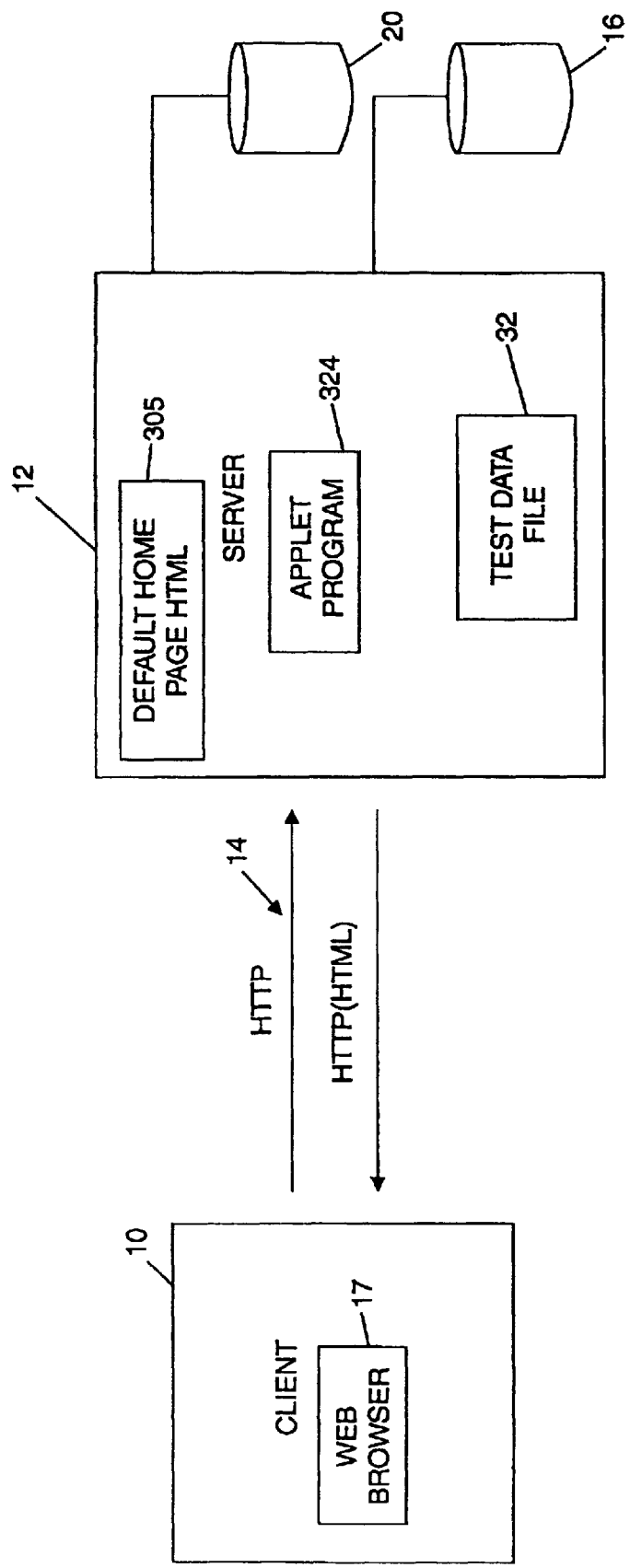

FIG. 6 is a block diagram of a client, a server and networking communication lines on the WWW in accordance with a fourth embodiment of the present invention.

FIG. 7 is a flow chart illustrating functions of the client and server within the network of FIG. 6 according to the fourth embodiment of the present invention.

DETAILED DESCRIPTION OF THE PREFERRED EMBODIMENTS

Figure 1:
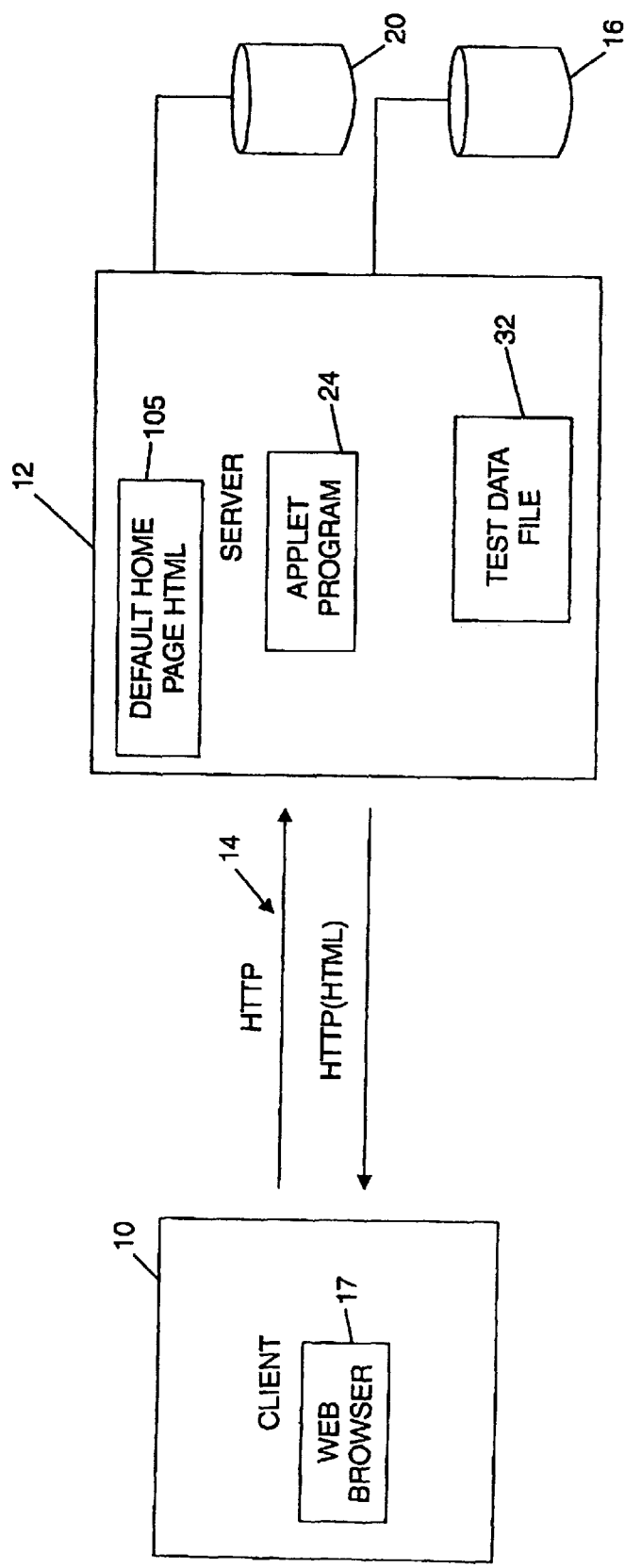
FIG. 1 is a block diagram of a client, a server and networking communication lines on the WWW in accordance with the present invention.

Referring now to the drawings in detail wherein like reference numbers indicate like elements throughout, FIG. 1 illustrates a client 10, server 12 and networking communication lines 14. While the following embodiments are described in a WWW environment, the present invention is also applicable to non-WWW and non-Internet client/server environments in which the client can automatically load and execute a program which has been downloaded from the server. Server 12 manages a data base 16 of HTMLs stored on DASD. There can be other routers (or "intermediary servers") (not shown) between client 10 and server 12 to participate in the routing of communications between the client and the server. The client 10 includes a web browser 17. In the illustrated example, web browser 17 communicates with the server 12 using the HTTP access method. The server can return an HTML for a web page imbedded in the HTTP communication. The routers, if any, also communicate with the client and server 12 using the HTTP access method.

The HTML defines the composition of each entry on the web page and the nature of the entry—text, graphic, hot link, applet, audio file or video file. While the HTML contains the actual text, the HTML contains only a pointer to each graphic, applet, audio file and video file and not the graphic, applet, audio file or video file itself. The graphics, applets, audio files and video files may be stored in a different data base managed by the same or different server. In the illustrated example, server 12 also manages a data base 20 for the graphics, applets, audio files and video files, and uses the HTTP access method for the graphics. (Alternately, a file transport protocol (FTP) access method could be used to access data base 20.) The industry standard format of the HTMLs is further described in "HTML for Fun and Profit" by Mary E. S. Morris published in 1995 by SunSoft press, A Prentice Hall title.

The following is an example of an HTML:

33. <HTML>
35. <HEAD>
37. <TITLE>Jim's home page<TITLE>
39. </HEAD>
40. <CENTER><H1>Jim</H1><CENTER>

-continued

41. <CENTER><b><i>LastUpdate - </i></b<tt>September 06th, 1996</tt></CENTER>
42. <p><br>
43. <center><h3><IMG SRC = "pics/icons/smiley.gif">
48. RESUME </h3></center>
49. <hr>
50. <IMG src="adam.gif" border=0 align=right ALT="Photo not displayed ...">
52. Jim__in__ny@vnet.ibm.com<br>
54. <P>
60. 607-123-4567 <br>
    <br>
    <p>
70. <a href="quicklist.html"> Most Used and Favorite Links </a>
    <br CLEAR=ALL>
80. <RIGHT>No Photo Available for me...Here is my son Adam</RIGHT>
    <HR>
    <br>
86. <A HREF="people.htm"> <IMG SRC="people2jpg"WIDTH=100 HEIGHT=56></A>
88. <A HREF="resumes.htm"> <IMG SRC="resumes2.jpg" WIDTH=100 HEIGHT=56 ALT="resumes"><'A>
    <br>
89. <embed src="http://xxx.com/HELLO.WAV"hidden="true">
90. <embed src="http://www.xxx.com/vacation.avi" width=300 height=300 hidden="false">
91. <applet code="bounceword.class" width=435 height=125>
    <!pass in applet background red color value (0–255), default is 255>
    <param name=backrval value="255">
    <!pass in applet background green color value (0–255), default is 255>
    <param name=backgval value="255">
    <!pass in applet background blue color value (0–255), default is 255>
    <param name=backbval value="255">
    <!pass in string of words to bounce around, default is "hello">
    <param name=display value="Your Name Here">
    <!indicate if you want sound to ping when a word hits a wall and display the sound on/off button>
    <param name=sound value="beep.au">
    <!indicate if you want to display a start/stop button>
    <param name=stopbutton value="YES">
    </applet>
    <HR>
    </BODY>
    </HTML>

The first entry 33 "<HTML>" indicates that this is an html. The next entry 35"<HEAD >" indicates page header. The next entry 37 begins with a tag "<TITLE>" which indicates that the subsequent text is a title of the web page used for print job name and quicklist. The next entry 39 is the tag </HEAD> which indicates end of page header. The next entry 40 begins with the tag <CENTER><H1> and indicates the subsequent text should be centered. Likewise the next entry 41 begins with the tag <CENTER> and indicates that the subsequent text should be centered. The next entry 42 comprises the tag <p><br> which indicates paragraph and break. The next entry 43 begins with the <center> format tag and also includes a tag <IMG src which indicates that the following file names the graphic. Entry 48 indicates the text "RESUME" and the center format. The next entry 49 in the html is "<hr>" which means horizontal rule, i.e. straight line. The next entry 50 describes non-clickable graphic <IMG src="adam.gif" is the URL for the source of the graphic itself. "Border=0" and "align=right" specify the border and alignment characteristics of the graphic. The next entry 52 is the nonclickable text. The next entry 54 means a paragraph. The next entry 60 is for nonclickable text. Entry 70 begins with tag "<a>" which means that the subsequent text is a hot link/clickable text. Entry 80 is for nonclickable text. Entry 86 is for a hot link/clickable graphic which does not include any alternate text. Thus, each hot link in the HTML is prefaced by <a> or <A>, and the hot links may be simple text or graphics with or without alphanumeric characters. Entry 88 is for a hot link/clickable graphic, and includes alternate text "Resumes". Entry 89 is a reference to an audio file and entry 90 is a reference to a video file. Entry 91 (which extends for multiple lines) is a reference to an applet. Upon receipt of an HTML, web browser 17 can convert the HTML to a display of the web page, fetching the graphics, audio file, video file and applets. The foregoing HTML and display process is well known in the prior art.

Figure 2:
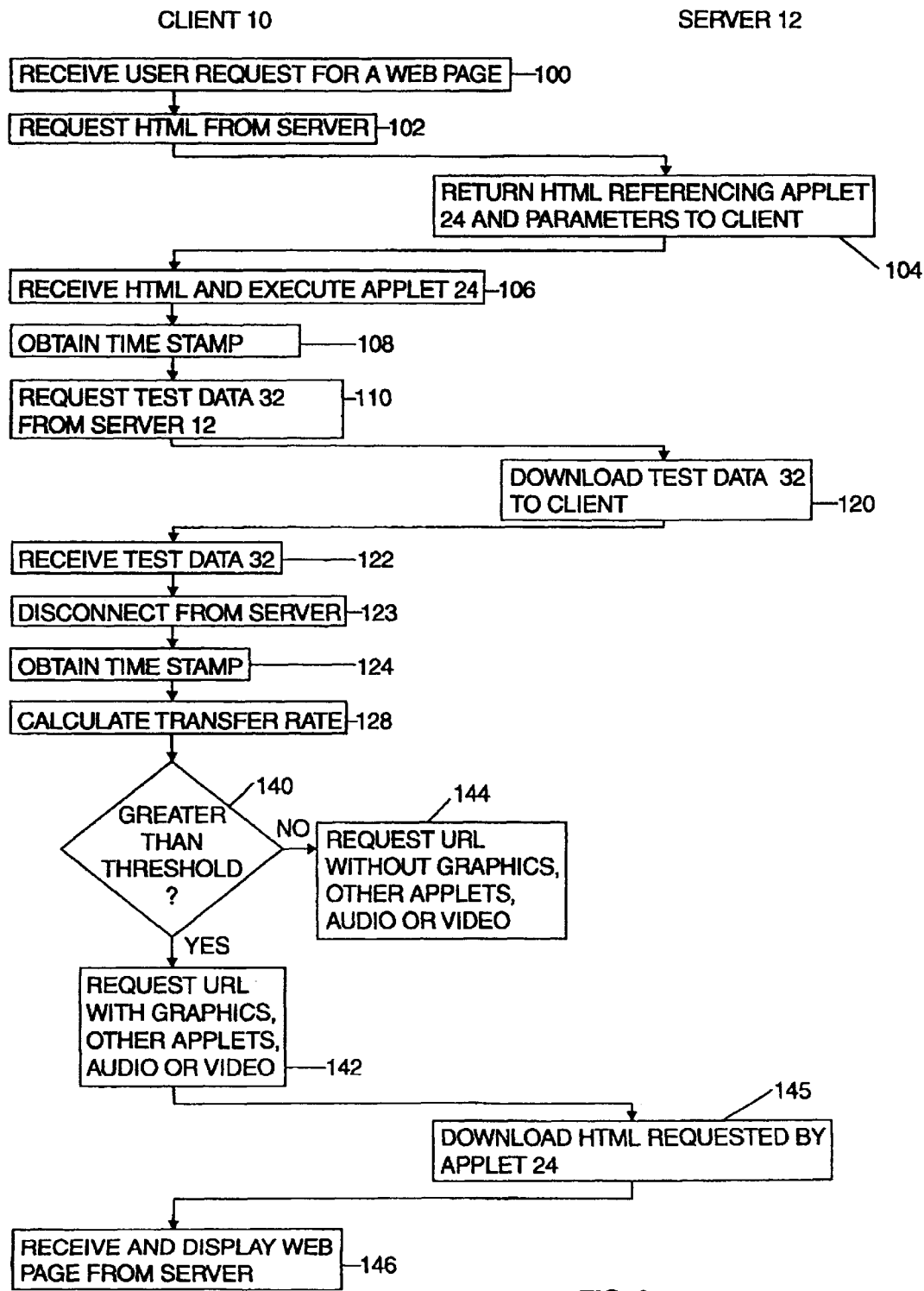
FIG. 2 is a flow chart illustrating functions of the client and server within the network of FIG. 1 according to a first embodiment of the present invention.

Steps 100 and 102 of FIG. 2 illustrate a known process performed by web browser 10 for fetching and displaying a web page. In step 100, the web browser 17 receives a request from a user for a home (web) page. The request can be made by the user specifying a URL or selecting a hot link. In the latter case, the web browser converts the hot link selection to a URL. Once the URL is known, either from the user or from the conversion, the web browser requests the HTML from the respective server (step 102) and the server complies (step 104). For purposes of explanation, assume that server 12 manages the requisite HTML. However, unlike the previously known process, the requested or "default" home page 105 does not include the expected information about the company, education institute, or organization. Instead, the default home page includes a reference to a short, Sun Microsystems Java (tm) applet (program) 24 and parameters for the applet 24. The web browser 17 then fetches the applet 24 and displays the default web page. The default web page comprises text to explain that the transfer rate determination is in progress. The default web page also includes instructions for those users who have web browsers that cannot execute Java applets and a hot link to request the web page with the expected information for the company, education institute or organization. If the client is capable of executing applet 24 and the determination proceeds normally, the determination will usually be completed in less than one half second and the user will not have time to read the text. However, if the client is not capable of executing applet 24 or the determination does not proceed expeditiously, then the default web page will be displayed for an extended period of time to enable the user to understand what is happening and to permit the user to select the hot link for the expected web page. The parameters within the default home page 105 include the URL of "test data file" 32 of known length. In one embodiment of the present invention, the parameters also include two other URLs for web pages which contain the expected information: One of the URLs is text only and does not include pointers to any graphics, other applets, audio files or video files and the other URL includes text and pointers to graphics, other applets, audio files and video files. In a first embodiment of the present invention, the parameters within the default home page also include a transfer rate threshold.

After being fetched by web browser 17, applet 24 executes in the client 10 (step 106). Applet 24 obtains a time stamp from the operating system within client 10 (step 108). Applet 24 then requests a predetermined "test data file" 32 from server 12 (step 110). In response, server 12 proceeds to fetch the test data file 32 and download it to applet 24 within client 10 (step 120). Immediately upon receipt of the test data file (step 122), applet 24 disconnects from the server (step 123), obtains another time stamp (step 124) and then calculates the transfer rate as the length of the test data file divided by the difference between the two time stamps (128). In the first embodiment of the present invention, after the applet 24 determines the transfer rate in step 128, the applet 24 compares the transfer rate to the threshold parameter (decision 140). If the transfer rate is greater than the threshold parameter, then the applet 24 requests the URL for the expected information. This URL includes the pointers for the graphics, other applets, audio files and video files (step 142). However, if the transfer rate is less than or equal to the threshold parameter, then the applet 24 requests the URL for the expected information. This URL does not include the pointers for the graphics, other applets, audio files or video files (step 144). In response, the server 12 returns to web browser 17 the HTML for the URL requested by the applet 24 (step 145). The web browser receives and displays the web page. If the HTML referenced graphics, other applets, audio files and video files, then the web browser fetches them also (step 146).

Figure 4:
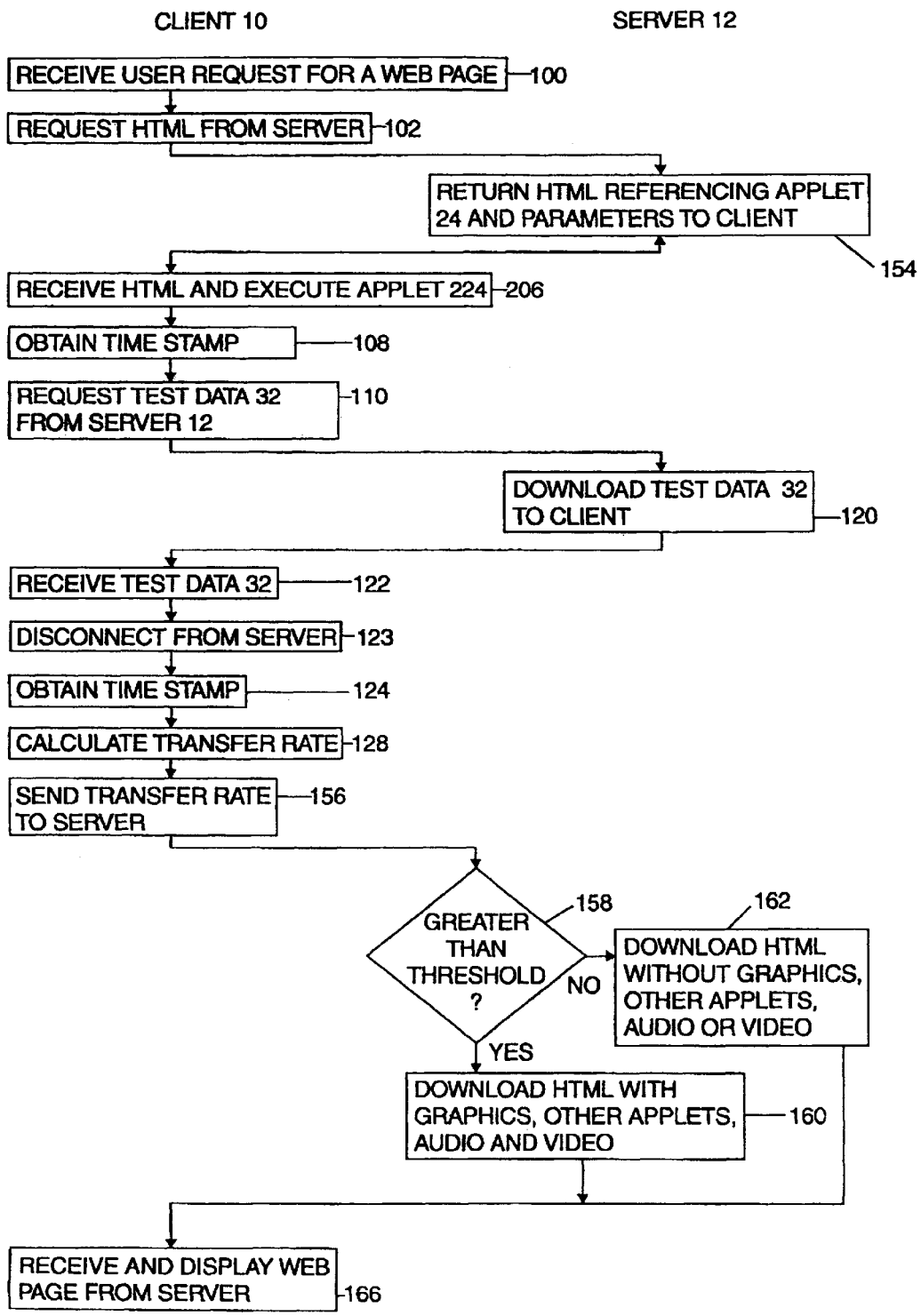
FIG. 4 is a flow chart illustrating functions of the client and server within the network of FIG. 3 according to a second embodiment of the present invention.

The second embodiment of the present invention is illustrated in FIGS. 3 and 4. Steps 100 and 102 are the same as in FIG. 2. However, a default home page 205 and an applet 224 are stored in server 12 instead of default home page 105 and applet 24, respectively. Default home page 205 does not include the transfer rate threshold parameter and instead includes the address of a CGI-Bin function within the server. Applet 224 is referenced in the default home page 205 which is returned in step 154 and received by the web browser in step 206. Web browser 17 receives the default home page 205 and then fetches and executes applet 224 (step 206). Steps 108–128 are also the same as in FIG. 2. After the applet 224 determines the data transfer rate in step 128, the applet 224 sends the transfer rate to the CGI-Bin function in the server 12 (step 156). In the server, the CGI-Bin function compares the transfer rate to a transfer rate threshold (decision 158). If the transfer rate is greater than the threshold, then the server 12 downloads the HTML that includes the pointers to the graphics, other applets, audio files and video files (step 160). However, if the transfer rate is less than or equal to the threshold, then the server 12 downloads the HTML that does not include the pointers to the graphics, other applets, audio files or video files (step 162). The client web browser 17 receives the appropriate HTML and displays the web page (step 166).

A third embodiment of the present invention is illustrated in FIGS. 5(*a*) and 5(*b*) and is the same as the second embodiment up to and including step 156. However, next server 12 compares the transfer rate to two different thresholds (decisions 170 and 172). If the transfer rate is above the higher threshold, then the server dynamically generates an HTML that includes text and pointers to all other elements— graphics, other applets, audio files and data files. (step 174). If the transfer rate is between the upper and lower thresholds, then the server dynamically generates an HTML that includes text and references to graphics only (step 176). If the transfer rate is below both thresholds, then the server dynamically generates an HTML that includes text and no references to graphics, other applets, audio files or video files (step 178). Addtional thresholds can be provided and comparisons made to them to further tailor the HTML to the transfer rate. The web browser receives the appropriate HTML and displays the corresponding web page (step 166).

A fourth embodiment of the present invention is illustrated in FIGS. 6 and 7. In the fourth embodiment, steps 100 and 102 are the same as in the first embodiment. Next, the server returns a default home page 305 which includes a reference to applet 324 (step 186). The web browser 17 receives the HTML for default home page 305, fetches applet 324 and then executes applet 324 in client 10 (step 306). Applet 324 determines the transfer rate as described above in steps 108–128. Then, applet 324 compares the transfer rate to a threshold parameter which was included as a parameter within the default web page 305 (decision 140). If the transfer rate is greater than the threshold parameter, then applet 324 advises the web browser 17 to display the graphics, other applets, audio files and video files of the next web page that it requests (step 188). However if the transfer rate is less than the threshold parameter, then the applet 324 advises the web browser to not fetch or display the graphics of the next web page it requests (step 190). Applet 324 then instructs web browser 17 to obtain the web page; included as a parameter within default home page 305 (step 192). This web page included as the parameter contains the expected information. In response, web browser 17 obtains and displays the web page indicated by the applet 324 (step 144), fetching the graphics, other applets, audio files and video files only if indicated to do so in step 190 (step 197).

Based on the foregoing, systems and methods according to the present invention have been disclosed for determining the transfer rate of a client and using that determination to select the components of a web page to download and display. However, numerous modifications and substitutions can be made without deviating from the scope of the present invention. For example, the server 12 can record when the server initially sends applet 24, 224 or 324 to the client to determine the transfer rate. For an interval thereafter, such as the next thirty minutes, the server 12 will assume that the transfer rate is approximately the same for client 10 and will not resend applet 24, 224 or 324 for subsequent HTML requests and will not re-determine the transfer rate. This reduces network traffic and delays in downloading the requested HTML. Therefore, the present invention has been disclosed by way of illustration and not limitation and reference should be made to the following claims to determine the scope of the present invention.

What is claimed is:

1. A method for determining a data transfer rate from a server to a client, said method comprising the steps of:
   the client requesting a world wide web page from the server;
   pursuant to said request, said client receiving from said server a test program or a reference to the test program instead of the requested web page; and
   the client executing said test program, said test program requesting test data from the server, measuring the elapsed time to obtain said test data, and calculating said data transfer rate based on the length of said test data and said elapsed time.

2. A method as set forth in claim 1 wherein said test program is an applet.

3. A method as set forth in claim 2 wherein said applet is embedded in a another web page, said other web page including parameters for said applet.

4. A method as set forth in claim 3 wherein said other web page also includes a text message indicating that said data transfer rate is being determined, said client displaying said text message.

5. A method as set forth in claim 1 wherein after the step of calculating said data transfer rate, further comprising the step of selecting a web page whose content corresponds to the client request and whose size is based on said calculated data transfer rate.

6. A method as set forth in claim 5 wherein the first said web page includes text and a graphical image and the selected web page includes said text but not said graphical image if the data transfer rate is below a threshold and said text and said graphical image if the data transfer rate is above said threshold.

7. A method as set forth in claim 1 wherein said web page includes business information about a company, educational institute or organization.

8. A method as set forth in claim 1 wherein said web page is a home page and said test program or reference to said test program is contained in a different web page.

9. A method as set forth in claim 1 wherein said client and said server are interconnected via a world wide web and said test program or said reference to said test program is received by said client via the world wide web.

10. A method for determining a data transfer rate from a server to a client, said method comprising the steps of:
    the client requesting a world wide web page from the server, said web page including information about a company, educational institute or organization, said information including text, said information also including a graphical image, an audio file or a video file;
    pursuant to said request, said client receiving from said server another web page including a reference to an applet; and
    the client receiving and executing said applet, said applet requesting test data from the server, measuring the elapsed time to obtain said test data, and calculating the data transfer rate based on the length of said test data and said elapsed time.

11. A method as set forth in claim 10 wherein said other web page also includes parameters for said applet.

12. A method as set forth in claim 10 wherein said other web page also includes a text message indicating that said data transfer rate is being determined.

13. A method as set forth in claim 10 wherein after the step of calculating said data transfer rate, performing the additional step of selecting a web page whose content corresponds to the client request and whose size is based on said calculated data transfer rate.

14. A method as set forth in claim 10 wherein said web page is a home page and said test program or reference to said test program is contained in a different web page.

15. A method for determining a data transfer rate from a server to a client, said method comprising the steps of:
    the server receiving a request from a client for a world wide web page managed by the server; and
    pursuant to said request, said server transferring to said client a test program or a reference to the test program instead of the requested web page, said test program when executed by said client requesting test data from the server, measuring the elapsed time to obtain said test data, and calculating said data transfer rate based on the length of said test data and said elapsed time.

16. A method as set forth in claim 15 wherein said web page includes business information about a corporation, educational institution or organization.

17. A method as set forth in claim 15 further comprising the subsequent step of said server responding to the request for test data from said client by furnishing said test data.

18. A method as set forth in claim 15 wherein said test program is an applet.

19. A method as set forth in claim 18 wherein said applet is embedded in a another web page transferred by said server to said client, said other web page including parameters for said applet.

20. A method as set forth in claim 19 wherein said other web page also includes a text message for display at said client indicating that said data transfer rate is being determined.

21. A method as set forth in claim 15 wherein after the step of calculating said data transfer rate, further comprising the step of selecting a web page whose content corresponds to the client request and whose size is based on said calculated data transfer rate.

22. A method as set forth in claim 15 wherein the first said web page includes text and a graphical image and the selected web page includes said text but not said graphical image if the data transfer rate is below a threshold and said text and said graphical image if the data transfer rate is above said threshold.

23. A method as set forth in claim 15 wherein said web page is a home page and said test program or reference to said test program is contained in a different web page.

24. A method as set forth in claim 15 wherein said client and said server are interconnected via a world wide web and said test program or said reference to said test program are sent by said server to said client via the world wide web.

25. A method for determining a data transfer rate from a server to a client, said method comprising the steps of:

the server receiving a request from the client for a world wide web page, said web page including information about a company, educational institute or organization, said information including text, said information also including a graphical image, an audio file or a video file; and pursuant to said request, said server transferring to said client another web page including a reference to an applet, said applet when executed at said client requesting test data from the server, measuring the elapsed time to obtain said test data, and calculating said data transfer rate based on the length of said test data and said elapsed time.

26. A method as set forth in claim 25 wherein said other web page also includes parameters for said applet.

27. A method as set forth in claim 25 wherein said other web page also includes a text message indicating that said data transfer rate is being determined.

28. A method as set forth in claim 25 wherein after the step of calculating said data transfer rate, further comprising the step of selecting a web page which is based on said calculated data transfer rate and corresponds to the client request.

29. A method as set forth in claim 25 wherein said web page includes text and a graphical image, video file or audio file and further comprising the steps of said server selecting said web page with said text but without said graphical image, video file or audio file if the data transfer rate is below a threshold and selecting said web page with said text and said graphical image, video file and audio file if the data transfer rate is above said threshold.

30. A method as set forth in claim 25 wherein said web page is a home page and said test program or reference to said test program is contained in a different web page.

31. A computer program product for determining a data transfer rate from a server to a client, said program product comprising:

a computer readable medium;

first program instruction means for instructing the server to read a request from a client for a world wide web page managed by the server; and second program instruction means for instructing the server to respond to said request by transferring to said client a test program or a reference to the test program instead of the requested web page, said test program when executed by said client requesting test data from the server, measuring the elapsed time to obtain said test data, and calculating said data transfer rate based on the length of said test data and said elapsed time; and wherein said first and second program instruction means are recorded on said medium.

32. A computer program product as set forth in claim 31 further comprising third program instruction means for selecting a web page whose content corresponds to the client request and whose size is based on said calculated data transfer rate.

33. A system for determining a data transfer rate from said system to a client, said system comprising:

means for receiving a request from a client for a world wide web page; and means, responsive to said request, for transferring to said client a test program or a reference to the test program instead of the requested web page, said test program when executed by said client requesting test data from said system, measuring the elapsed time to obtain said test data, and calculating said data transfer rate based on the length of said test data and said elapsed time.

34. A system as set forth in claim 33 further comprising means for selecting a web page whose content corresponds to the client request and whose size is based on said calculated data transfer rate.

* * * * *